(12) United States Patent
Tang

(10) Patent No.: US 7,596,001 B2
(45) Date of Patent: Sep. 29, 2009

(54) EXPANSION CARD RETENTION ASSEMBLY

(75) Inventor: Zi-Ming Tang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/126,990

(22) Filed: May 26, 2008

(65) Prior Publication Data

US 2009/0168375 A1     Jul. 2, 2009

(30) Foreign Application Priority Data

Dec. 27, 2007     (CN) .................. 2007 1 0203444

(51) Int. Cl.
*H05K 7/12* (2006.01)
(52) U.S. Cl. .................. 361/801; 361/726; 361/732; 361/747; 361/759; 312/223.2
(58) Field of Classification Search .............. 361/726, 361/732, 747, 759, 801; 312/223.1, 223.2
See application file for complete search history.

(56) References Cited

U.S. PATENT DOCUMENTS

| | | | |
|---|---|---|---|
| 6,515,867 B2* | 2/2003 | Sheng-Hsiung et al. | 361/759 |
| 7,002,811 B2* | 2/2006 | Jing et al. | 361/801 |
| 7,283,376 B2* | 10/2007 | Han et al. | 361/801 |
| 2007/0242442 A1* | 10/2007 | Dai | 361/801 |

* cited by examiner

*Primary Examiner*—Dameon E Levi
(74) *Attorney, Agent, or Firm*—Zhigang Ma

(57) ABSTRACT

An exemplary retention assembly (30) is used to assemble an expansion card. The expansion card is mounted to an expansion card bracket (22) attached to an enclosure (24) The retention assembly includes a foldable holder (32), a resisting handle (34), and a first elastic member (37). The foldable holder is rotatable relative to the enclosure and configured for resisting the expansion card bracket when the retention assembly is in a closed state. The resisting handle is slidable relative to the enclosure, and configured for preventing the foldable holder from rotating when the retention assembly is in the latching state, and for allowing the foldable holder to rotate under the torsion force when unlatching the retention assembly. The first elastic member is used to provide torsion force. One end of the first elastic member is securely connected to the foldable holder, and the other end of the first elastic member is fixed relative to the enclosure.

14 Claims, 5 Drawing Sheets

EXPANSION CARD RETENTION ASSEMBLY

BACKGROUND OF THE INVENTION

1. Field of the Invention

The present invention generally relates to retention assemblies for securing a plurality of expansion cards to an electronic device enclosure.

2. Discussion of the Related Art

Referring to FIG. 5, a typical retention assembly for securing an expansion card to an electronic device enclosure 13 is shown. The retention assembly includes a catching plate 11, a plurality of bolts 12, and a plurality of covers 14. An expansion slot (not labeled) is defined in the electronic device enclosure 13. A bulge 132 is formed surrounding a periphery of the expansion slot. The covers 14 are configured for covering the expansion slot and securing/protecting the expansion cards. Each of the covers 14 is an elongated piece having a bent portion (not labeled) adjoining to the bulge 132. When an expansion card is fixed to the electronic device enclosure 13, the catching plate 11 is positioned on the bent portions of the covers 14, and is fixed on the electronic device enclosure 13 by the bolts 12, thus fastening the covers 14 to the electronic device enclosure 13.

In the above retention assembly, the covers 14 are secured to the electronic device enclosure 13 by using the bolts 12. However, installing or removing the bolts 12 is unduly time-consuming and laborious. This leads to lower efficiency of installation and removal of expansion cards. In addition, a tool for installing or removing bolts is needed in installation or removal. These problems are multiplied in mass production facilities. Furthermore, when used for a period of time, bolts 12 and the screw holes cannot reliably engaged with each other any more.

Therefore, a retention assembly which overcomes the above-described shortcomings is desired.

SUMMARY

An exemplary retention assembly is used to assemble an expansion card mounted to an expansion card bracket to an enclosure. The retention assembly includes a foldable holder, a resisting handle, and a first elastic member. The foldable holder is rotatable relative to the enclosure and configured for resisting the expansion card bracket when the retention assembly being in a latching state. The resisting handle is slidable relative to the enclosure, and configured for preventing the foldable holder from rotating when the retention assembly is in the latching state, and for allowing the foldable holder to rotate under the torsion force when unlatching the retention assembly. The first elastic member is used to provide torsion force. One end of the first elastic member securely connected to the foldable holder, and the other end of the first elastic member fixed relative to the enclosure.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the retention assembly. Moreover, in the drawings, like reference numerals designate corresponding parts throughout the several views.

DETAILED DESCRIPTION OF THE EMBODIMENTS

Figure 1:
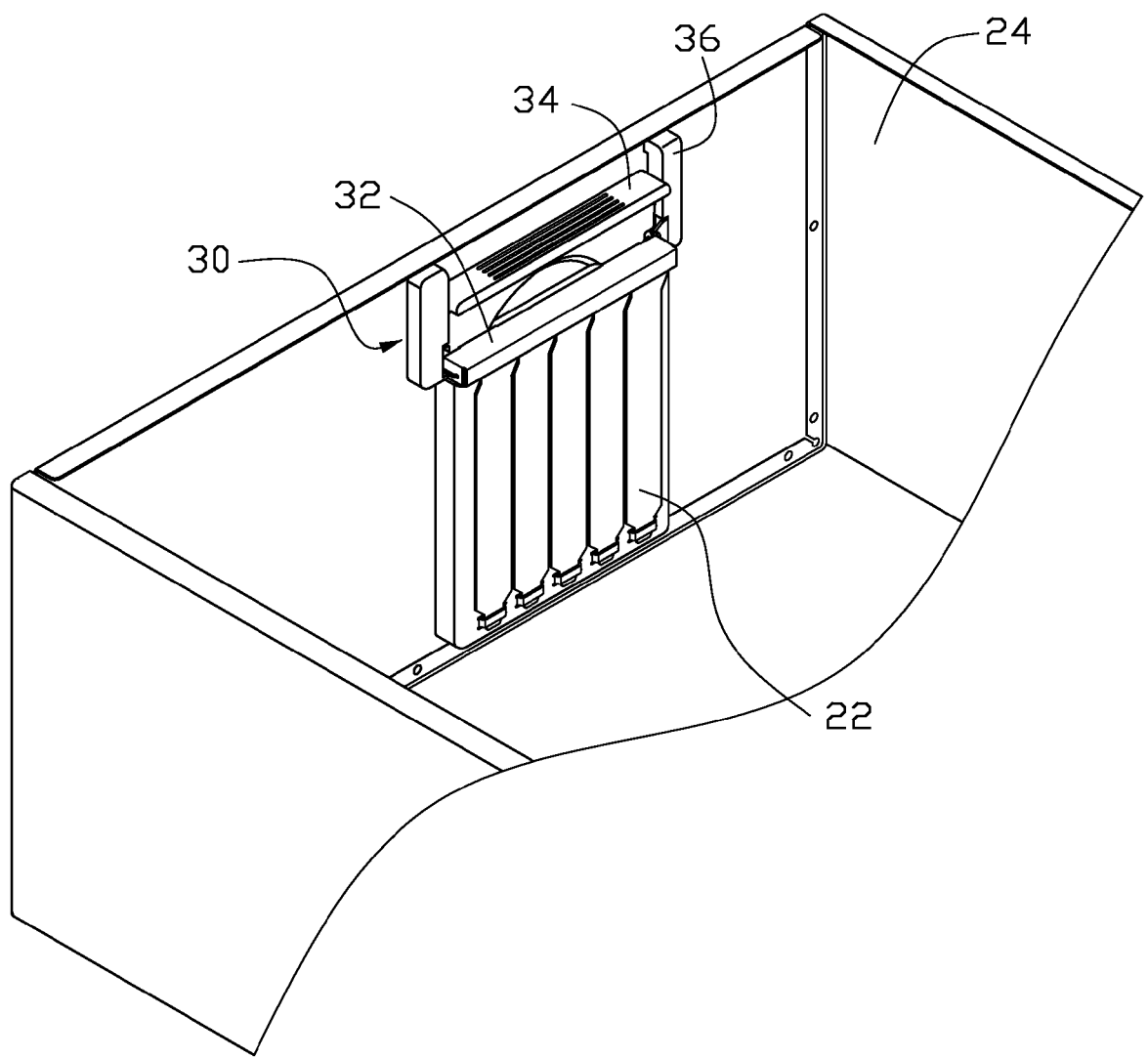
FIG. 1 is an assembled, isometric view of a retention assembly in a closed state in accordance with an exemplary embodiment of the present invention, showing the retention assembly assembled to an enclosure.

Referring to the drawings in detail, FIG. 1 shows a retention assembly 30 of an exemplary embodiment of the present invention assembled to one wall of an enclosure 24 such as an electronic device enclosure. The retention assembly 30 is configured to fasten expansion card brackets 22 of expansion cards (not shown) to an expansion card seat of the enclosure 24.

Figure 2:
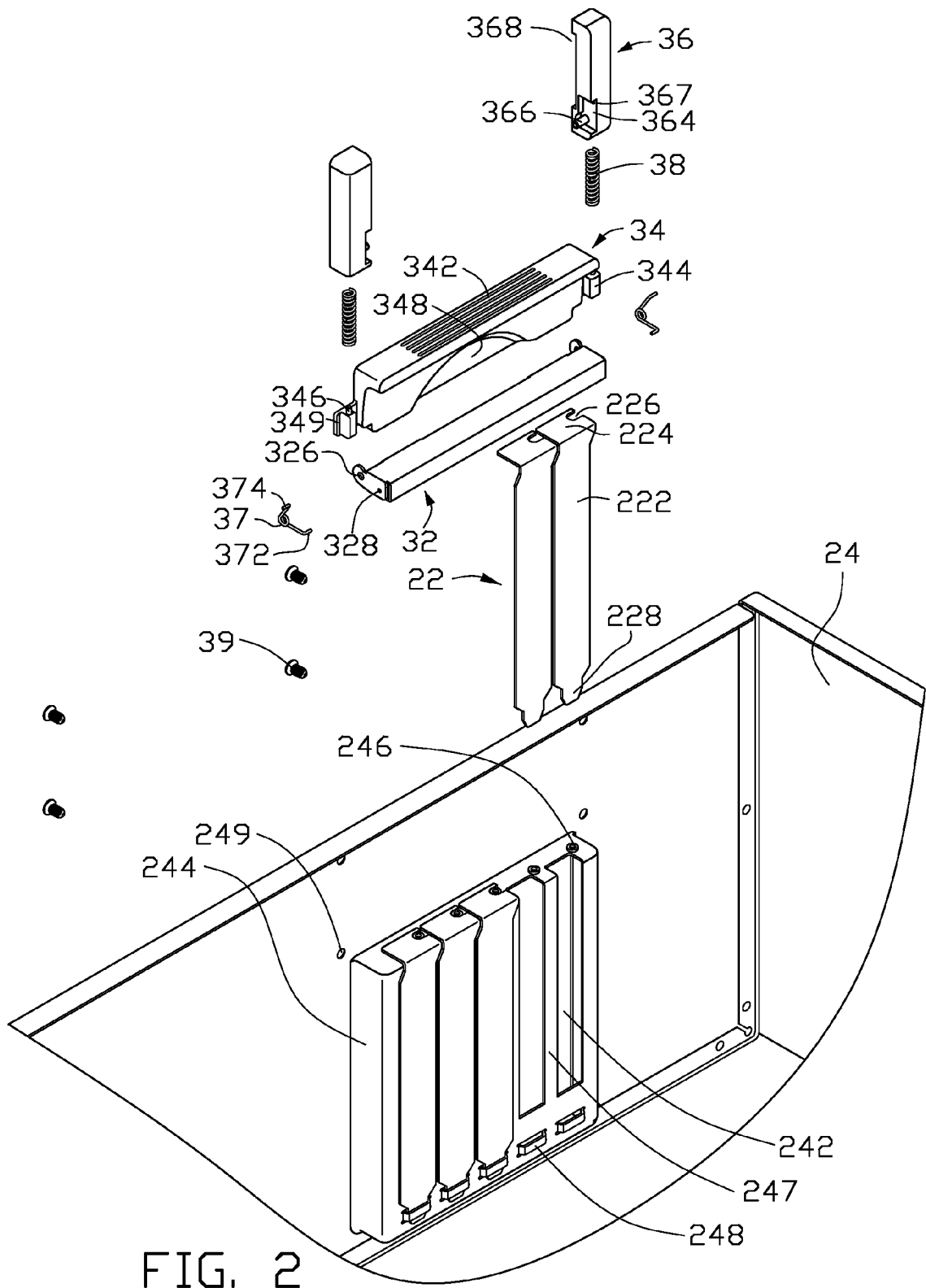
FIG. 2 is a partially exploded, isometric view of the retention assembly and the enclosure of FIG. 1.

For the exemplary purposes, only one expansion bracket 22 and one expansion card seat will be detailed to more clearly describe the exemplary embodiment. Referring to FIG. 2, the expansion card bracket 22 includes an elongated main portion 222 and a fastening portion 224 extending perpendicularly from an end of the elongated main portion 222. An edge of the fastening portion 224 defines a notch 226 correspondingly. The expansion card bracket 22 further includes a tab 228 extending from another end of the elongated main portion 222 opposite to the fastening portion 224. A width of the tab 228 is smaller than that of the main portion 222.

The enclosure 24 includes an expansion card platform (rack) 244. The platform 244 extends perpendicularly inwards forming at least one expansion card seat 247. For the exemplary purposes, only one expansion card seat 247 will be described to more clearly disclose the exemplary embodiment. The expansion card seat 247 defines a cutout 242 extending from a first side of the platform 244 to a second side of the platform 244. The expansion card seat 247 further forms a positioning member 246 on a first surface and corresponding to the cutout 242, and a hooking member 248 adjacent to a second surface and corresponding to the cutout 242. The positioning member 246 is configured to be received in the notch 226 and the hooking member 248 is configured to be insertable by the tab 228. In the illustrated embodiment, the platform 244 is substantially rectangular in shape, and has four surfaces including the first surface and the second surface opposite to each other.

The retention assembly 30 includes a foldable holder 32, a resisting handle 34, two fastening members 36, two torsion springs 37, and two compressed springs 38.

The foldable holder 32 is an elongated frame preferably having a length corresponding to that of the first surface of the enclosure 24. Each end on opposite sides of the foldable holder 32 defines a fastening hole 326 and a pivot hole 328.

The resisting handle 34 is substantially a hollow frame having a main body 342. Each end on opposite sides of the main body 342 forms an ear 344. The resisting handle 34 preferably has a length corresponding to that of the foldable holder 32. Each ear 344 forms a pole 346 extending perpendicular to the resisting handle 34. A sliding piece 349 is formed at an edge of each ear 344. Each ear 344 further has a projection (not labeled) adjacent to the sliding piece 349. The main body 342 defines a depression 348 for facilitating pulling the resisting handle 34.

For exemplary purposes, only one fastening member, one torsion spring 37 and one compressed spring 38 will be described to clearly disclose the exemplary embodiment. The fastening member 36 is substantially a cuboid. The fastening member 36 defines a depression 364 in a first side. A pivot shaft 366 extends from a bottom of the depression 364, and an engaging hole 367 is defined in a bottom of the depression 364. A second side of the fastening member 36 defines a guide slot (not labeled), and the bottom of the guide slot further defines a receptacle 368. The receptacle 368 is configured for receiving one corresponding compressed spring 38. The guide slot is longer than the sliding piece 349 of the resisting handle 34, thus the sliding piece 349 may be slidably received in the guide slot. The receptacle 368 is longer than each projection of the resisting handle 34, thus the projection of each ear 344 may be slidably received in the receptacle 368.

The torsion spring 37 is used to provide a torsion force. The torsion spring 37 includes a first positioning end 372 configured to be fixedly inserted into the fastening hole 326 of the foldable holder 32 and a second positioning end 374 for fixedly inserted into the engaging hole 367 of the resisting handle 34. The torsion spring 37 can be replaced by other torsion elastic members formed by other means so long as the torsion elastic member can provide the torsion force. The compressed springs 38 may be replaced by other compressed elastic members formed in other fashions such as rubber sticks, sponges, so long as the compressed elastic member can provided an axial force.

Figure 3:
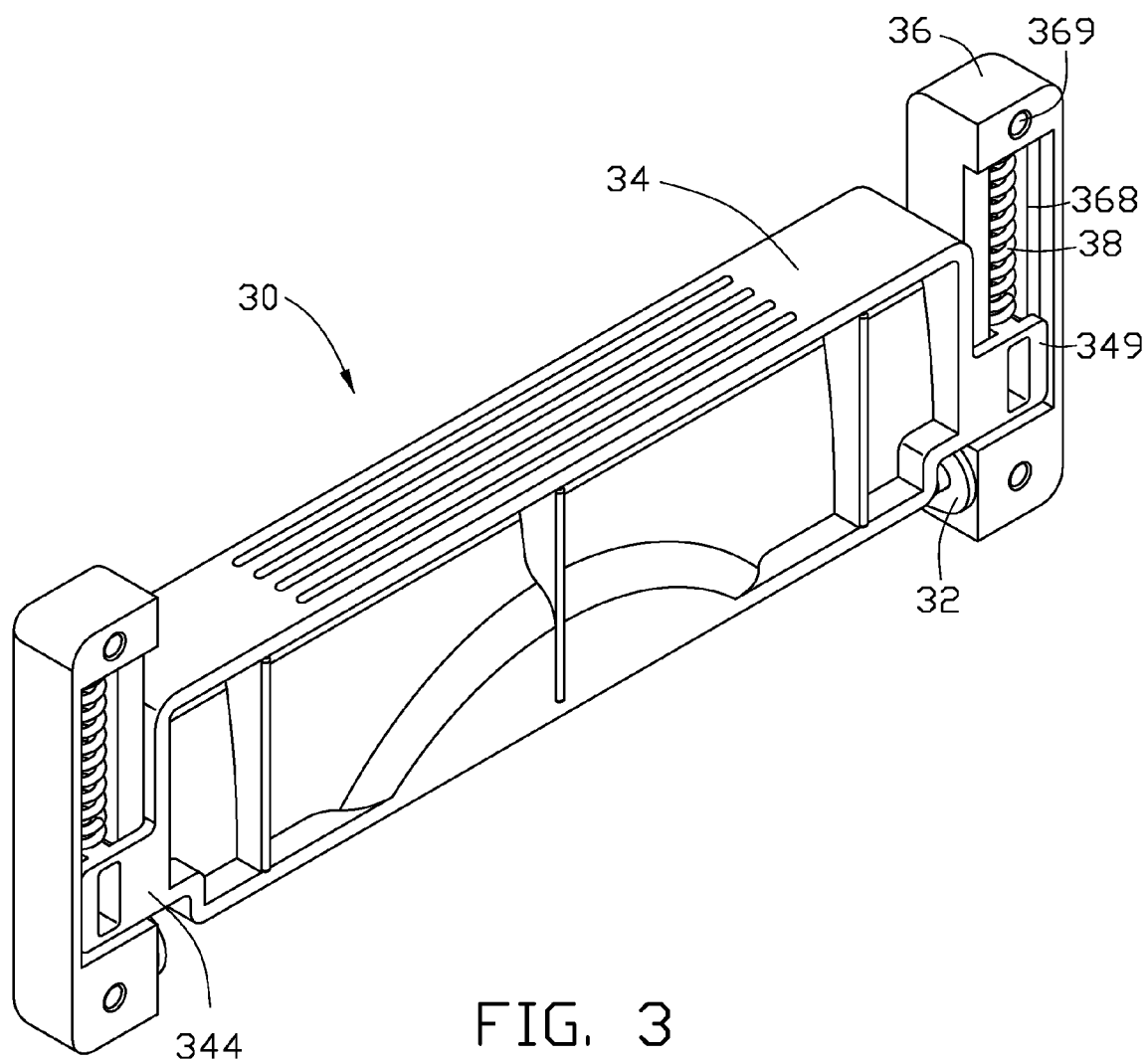
FIG. 3 is an assembled, isometric view of the retention assembly of FIG. 1.

Referring to FIG. 3, to assemble the retention assembly 30, the pivot shaft 366 of each fastening member 36 is first inserted through the springs of the torsion springs 37 and then into the pivot holes 328 of the foldable holder 32 correspondingly. Thus, the foldable holder 32 is rotatable relative to the pivot shaft 366 of the fastening member 36. The sliding pieces 349 and the projections of the ears 344 are inserted into the guiding slot and the receptacle 368 of each fastening member 36 correspondingly. The compressed springs 38 are received in the receptacles 368 of the fastening members 36. An end of each compressed spring 38 is sleeved on one of the poles 346 of the resisting handle 34 resisting the ear, and the other end of each compressed spring 38 abuts a sidewall forming the receptacle 368 of the fastening member 36. The fastening members 36 are fixed to the enclosure 24 with the receptacles 368 facing the enclosure 24. The fastening members 36 should be positioned in manner such that the retention assembly 30 is adjacent to the platform 244 of the enclosure 24 and the foldable holder 32 pushes against the first surface of the expansion card seat 247. The resisting handle 34 is slidable relative to the fastening member 36 along the guide slot.

In use, the retention assembly 30 has two states, an opened state and a closed state. Referring to FIG. 1 again, in the closed state, the expansion card is installed in the expansion card seat 247, the tab 228 of the expansion card bracket 22 is engaged with the hooking member 248 and the positioning member 246 is engaged in the notch 226 of the expansion card bracket 22. The foldable holder 34 pushes the fastening portion 224 of the expansion card bracket 22 against the platform 244. The torsion springs 37 are retracted and the compressed springs 38 are in an original state. The resisting handle 34 leans against a sidewall of the enclosure 24 and abuts the foldable holder 32. Because the compressed springs 38 pushes the ear 344 in a direction towards the expansion card bracket 22, the resisting handle 34 consequently also pushes against an edge of the foldable holder 32, thus the foldable holder 32 is non-rotatable.

Figure 4:
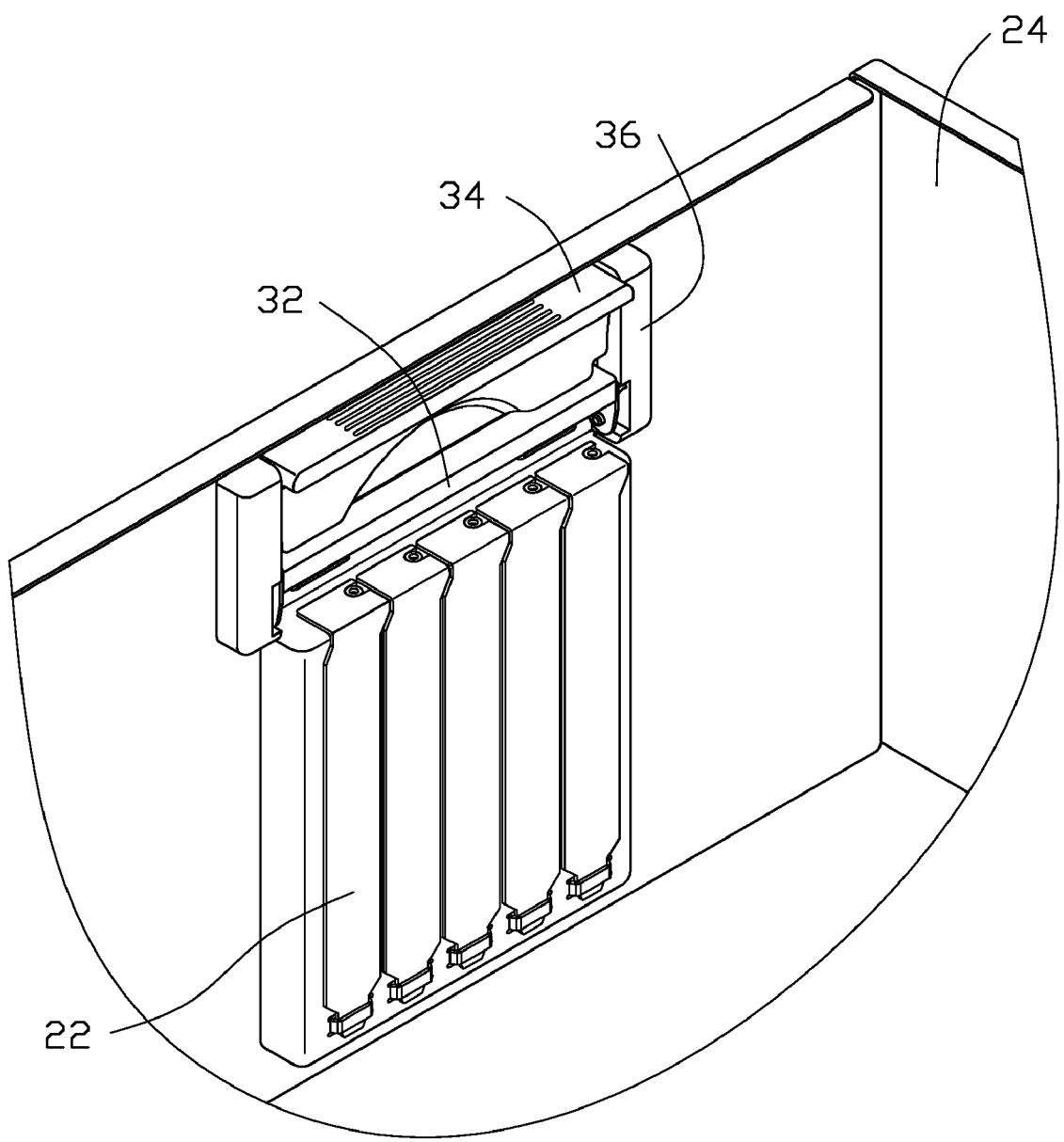
FIG. 4 is similar to FIG. 1, but showing an opened state of the retention assembly.
Figure 5:
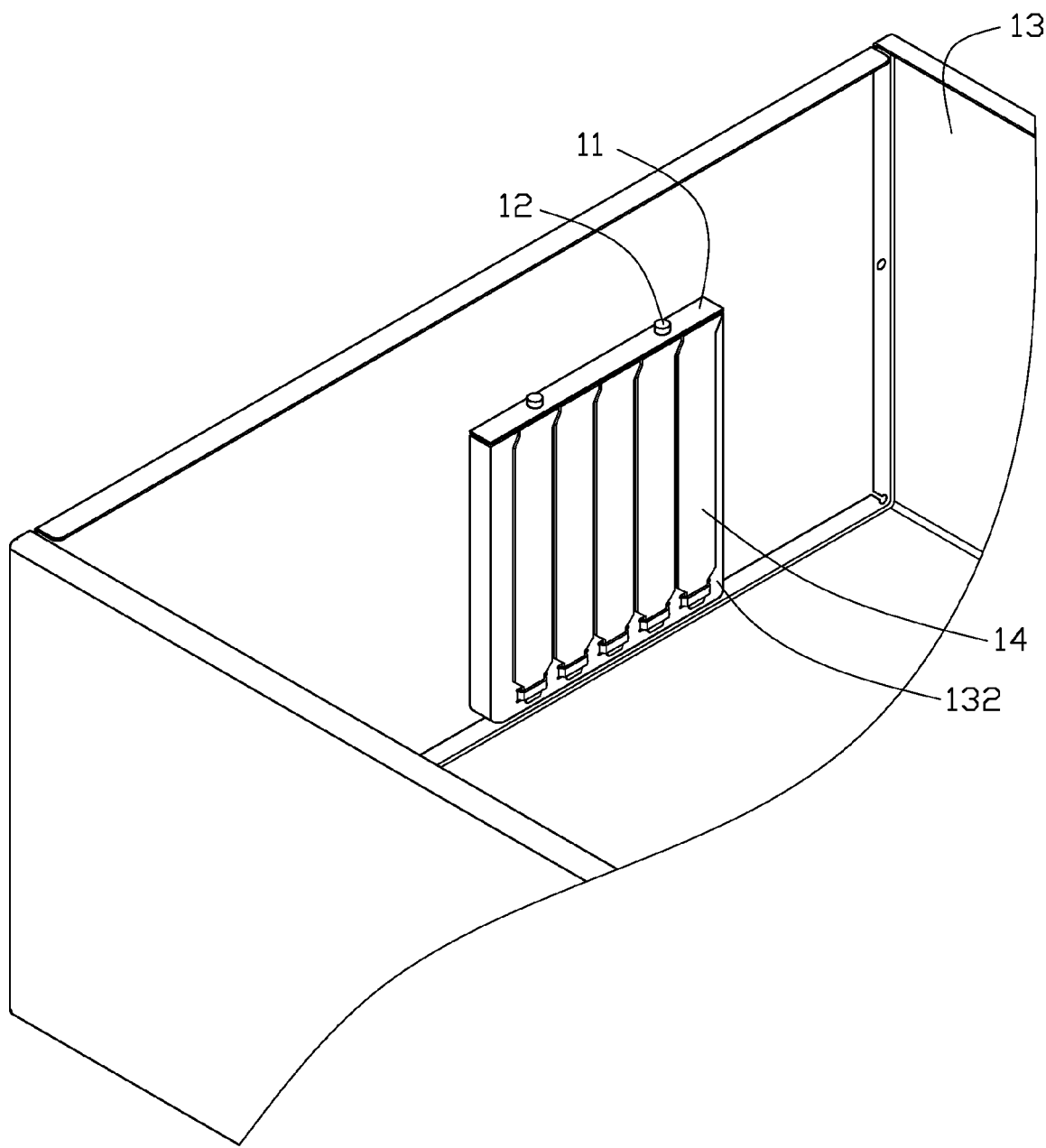
FIG. 5 is an assembled, isometric view of a conventional retention assembly assembled to an enclosure.

Referring to FIG. 4, to add or remove extra expansion cards, the retention assembly 30 is pulled from the closed state to the opened state. The resisting handle 34 is pulled in a direction away from the expansion card brackets 22. Thus, the foldable holder 32 would no longer be blocked by the resisting handle 34 and is rotatable. In the process, the compressed springs 38 becomes further compressed, and the torsion springs 37 are in a free state. The foldable holder 32 is rotated against a torsion force of the torsion springs 37, thus opening away from the fastening portions 224 of the expansion card brackets 22. When the foldable holder 32 rotates to an angle about 90 degrees, the expansion card brackets 22 can then be removed from or inserted into an empty expansion card seat 247. When the expansion card brackets 22 have been installed onto or detached from the enclosure 24, the foldable holder 32 is pushed to rotate until the expansion card brackets 22 are fastened again. The resisting handle 34 is released and slides toward the platform 244 of the enclosure 24 under the axial force of the compressed springs 38 so as to hold the expansion card bracket 22 again. The torsion springs 37 are restored again.

Alternatively, only one or more than two torsion springs 37 and only one or more than two compressed springs 38 may be provided. The compressed springs 38 may be omitted. The fastening members 36 may be fixed to the enclosure 24 by various means such as welding, riveting or screwing. In this embodiment, the fastening members 36 are fixed by screwing as follows: the enclosure 24 defines a plurality of through holes 249, and the fastening members 36 define a plurality of threaded holes 369. A plurality of bolts 39 are provided to engage with the through holes 249 and the thread holes 369. The fastening member 36 may be a part of the enclosure 24.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A retention assembly for assembling an expansion card, the expansion card being mounted to an expansion card bracket attached to an enclosure, the retention assembly comprising:
    a foldable holder being rotatable relative to the enclosure, and the foldable holder to resist the expansion card bracket when the retention assembly is in a closed state;
    a resisting handle being slidable relative to the enclosure, and the resisting handle to prevent the foldable holder from rotating when the retention assembly is in the closed state, and for allowing the foldable holder to rotate when unlatching the retention assembly; and
    a first elastic member for providing torsion force for forcing the foldable holder to rotate, including an end securely connected to the foldable holder and an opposite end fixed relative to the enclosure;
    a second elastic member for providing an axial force, the second elastic member is compressed to position the resisting handle when the retention assembly is in the closed state;
    wherein the second elastic member comprises two compressed springs, and the first elastic member comprises two torsion springs.

2. The retention assembly as claimed in claim 1, wherein the retention assembly further comprises two fastening members fixedly connected to the enclosure, each end of the foldable holder is rotatably attached to the fastening members, and the resisting handle is slidably attached to the fastening members.

3. The retention assembly as claimed in claim 2, wherein the foldable holder is an elongated frame and defines a fastening hole and a pivot hole in each end, each fastening member forms a pivot shaft, the pivot shafts are rotatably inserted into the pivot holes of the foldable holders correspondingly, each torsion spring includes two positioning ends, one positioning end of each torsion spring is fixedly inserted into a corresponding fastening hole.

4. The retention assembly as claimed in claim 3, wherein the resisting handle comprises a main body and two ears formed at opposite ends of the main body, each ear forms a pole, one end of each compressed spring sleeves on the pole of one corresponding ear.

5. The retention assembly as claimed in claim 4, wherein each fastening member defines a depression in one side, the pivot shaft extends from a bottom of the depression, and an engaging hole is defined in a bottom of the depression, the other positioning end of each torsion spring is fixedly inserted into one corresponding engaging hole.

6. The retention assembly as claimed in claim 5, wherein each fastening member defines a guide slot in a side adjoining the side defining the depression, and the bottom of the guide slot further defines a receptacle, the receptacle is configured for receiving one compressed spring, a sliding piece is formed at an edge of each ear of the resisting handle and a projection is formed on each ear, and the guide slot is longer than the sliding piece of the resisting handle, thus the sliding piece is slidably received in the guide slot, the receptacle is longer than the projection of the resisting handle, thus the projection may be slidably received in the receptacle.

7. The retention assembly as claimed in claim 4, wherein the main body of the resisting handle defines a depression for facilitating pulling the resisting handle.

8. The retention assembly as claimed in claim 1, wherein each expansion card bracket comprises an elongated main portion, a fastening portion formed at an end of the main portion, and a tab formed at an opposite end of the main portion, the fastening portion defines a notch at an edge, the enclosure comprises an expansion card platform, the platform extends perpendicularly inwards forming at least one expansion card seat, the expansion card seat defines a cutout extending from a side of the platform to a second side of the platform, the expansion card seat further forms a positioning member on the a first surface corresponding to the cutout, and a hooking member adjacent to a second surface and corresponding to the cutout, the positioning member is configured to be received in the notch and the hooking member is configured to be insertable by the tab, and the fastening portion of each expansion card bracket is held between one sidewall and the foldable holder.

9. The retention assembly as claimed in claim 8, wherein the platform of the enclosure is substantially rectangular, and has four surfaces including the first surface and the second surface.

10. A retention assembly for assembling an expansion card, the expansion card being mounted to an expansion card bracket attached to an enclosure, the retention assembly comprising:

a foldable holder being rotatable relative to the enclosure;
a resisting handle being slidable relative to the enclosure; and
a first elastic member for providing torsion force, two ends of the first elastic member securely connected to the foldable holder and relative to the enclosure respectively;
a second elastic member for providing an axial force, the second elastic member is compressed to position the resisting handle when the retention assembly unlatches the expansion card wherein when the retention assembly latches the expansion card to the enclosure, the foldable holder abuts the expansion card bracket, the resisting handle stands against an edge of the foldable holder to prevent the foldable holder from rotating, and the first elastic member is retracted; when the retention assembly unlatches the expansion card from the enclosure, the resisting handle is pulled to slide relative to the enclosure for allowing the foldable holder to rotate under the torsion force; the second elastic member comprises two compressed springs, and the first elastic member comprises two torsion springs.

11. The retention assembly as claimed in claim 10, wherein the retention assembly further comprises two fastening members fixedly connected to the enclosure, the foldable holder is rotatably connected to the fastening members, and the resisting handle is slidably connected to the fastening members.

12. The retention assembly as claimed in claim 10, wherein each expansion card bracket comprises an elongated main portion, a fastening portion formed at one end of the main portion, and a tab formed at an opposite end of the main portion, the fastening portion defines a notch at an edge, the enclosure comprises an expansion card platform, the platform extends perpendicularly inwards forming at least one expansion card seat, the expansion card seat defines a cutout extending from a side of the platform to a second side of the platform, the expansion card seat further forms a positioning member on a first surface corresponding to the cutout, and a hooking member adjacent to a second surface opposite to the first surface and corresponding to the cutout, the positioning member is configured to be received in the notch and the hooking member is configured to be insertable by the tab, and the fastening portion of each expansion card bracket is held between one sidewall and the foldable bolder.

13. The retention assembly as claimed in claim 1, wherein the first elastic member is released when unlatching the retention assembly to allow the foldable holder to rotate; the second elastic member is further compressed when unlatching the retention assembly to allow the foldable holder to rotate.

14. The retention assembly as claimed in claim 10, wherein the first elastic member is released when unlatching the retention assembly to allow the foldable holder to rotate; the second elastic member is further compressed when unlatching the retention assembly to allow the foldable holder to rotate.

* * * * *